(12) United States Patent
Basile et al.

(10) Patent No.: US 6,399,562 B2
(45) Date of Patent: Jun. 4, 2002

(54) SOLVENT COMPOSITIONS

(75) Inventors: Giampiero Basile; Mario Visca; Ezio Musso, all of Alessandria (IT)

(73) Assignee: Ausimont S.p.A., Milan (IT)

( * ) Notice: Subject to any disclaimer, the term of this patent is extended or adjusted under 35 U.S.C. 154(b) by 0 days.

(21) Appl. No.: 09/779,527

(22) Filed: Feb. 9, 2001

(30) Foreign Application Priority Data

Feb. 11, 2000 (IT) .......................................... MI00A0230

(51) Int. Cl.⁷ .................................................. C08J 9/14
(52) U.S. Cl. ....................... 510/411; 510/408; 510/177; 510/410; 134/26
(58) Field of Search ............................... 510/177, 408, 510/410, 411; 134/26

(56) References Cited

U.S. PATENT DOCUMENTS

| | | | | |
|---|---|---|---|---|
| 3,250,806 A | * | 5/1966 | Warnell et al. | |
| 3,515,701 A | * | 6/1970 | Tiers et al. | |
| 5,084,146 A | * | 1/1992 | Huang | |
| 5,091,589 A | * | 2/1992 | Meyer et al. | |

FOREIGN PATENT DOCUMENTS

EP 0 695 775 A1 2/1996
EP 0 805 199 A2 11/1997

\* cited by examiner

*Primary Examiner*—Mark Kopec
*Assistant Examiner*—Gregory E. Webb
(74) *Attorney, Agent, or Firm*—Arent, Fox, Kintner, Plotkin & Kahn

(57) ABSTRACT

Azeotropic or near azeotropic solvent compositions, based on 1-difluoromethoxy-1,1,2,2-tetrafluoroethyl difluoromethyl ether, essentially consisting of (% by weight):

| | |
|---|---|
| I) 1-difluoromethoxy 1,1,2,2-tetrafluoroethyl difluromethyl ether ($HCF_2OCF_2CF_2OCF_2H$); | 15–99 |
| isopentane | 85–1 |
| II) 1-difluromethoxy 1,1,2,2-tetrafluroethyl difluoromethyl ether ($HCF_2OCF_2CF_2OCF_2H$); | 25–99 |
| methyl-acetate | 75–1 |
| III) 1-difluoromethoxy 1,1,2,2-tetrafluoroethyl difluromethyl ether ($HCF_2OCF_2CF_2OCF_2H$); | 35–99 |
| 1-bromo-propane | 65–1. |

9 Claims, No Drawings

SOLVENT COMPOSITIONS

The present invention relates to azeotropic or near azeotropic compositions based on hydrofluoropolyethers (HFPE) to be used as substituents of 1,1,2-trichloro-1,2,2-trifluoroethane (CFC 113).

More specifically the present invention relates to azeotropic or near azeotropic mixtures characterized by zero ODP (Ozono Depletion Potential) values or anyway lower than 0.027, by low GWP (Global Warming Potential) and VOC (Volatile Organic Compounds) values to be used as detergent and drying agents in substitution of CFC 113.

As known, CFC 113 has widely been used as solvent and/or drying agent for industrial applications requiring the removal of organic substances (greases, waxes, oils, resins) and/or water from solid surfaces of various nature (metal, glass surfaces, plastics or composites).

For example, CFC 113 has been commonly used for the removal of oils and/or abrasives from metal surfaces of mechanical parts characterized by complex shapes, for the cleaning of high precision metal components, for the removal of water traces from valuables and from components of high quality systems previously washed with aqueous mediums.

In particular in the electronics field, CFC 113 has been used for the removal of organic products and of moisture traces present on the surface of printed circuits characterized by a high density of hardly washable components and for which an high reliability is required.

The removal processes of contaminants from solid surfaces (metals, plastics, glass) are carried out by techniques which involve the solvent action in liquid phase (cold or hot) and/or by the vapour action; in this case the article is exposed to the fluid vapours at its boiling temperature. The vapours by condensing on the cold article surface achieve the solvent and cleaning action.

In all the mentioned applications CFC 113 has often been used also in combination with organic compounds of various nature in order to improve the solvent performances of the product itself. In particular, azeotropic or near azeotropic mixtures which had the advantage to avoid fractionations during the industrial steps of use, manufacture and recovery of the exhausted solvent, have widely been used. Azeotropic or near azeotropic mixtures, as known, are characterized by a composition of the liquid phase substantially equal to the vapour phase composition, they behave, therefore, as a pure compound with the advantage to positively utilize the different properties of the components of the mixture.

CFC 113 is characterized by particular chemical-physical properties so to be advantageously used in the previously described field and it allows, furthermore, a simple, cheap and safe use since it is stable, non flammable and non toxic.

CFCs and specifically CFC 113 have, however, the drawback to have a high ODP, wherefore, their production and commercialization have been banned since 1995.

The need was felt to have alternative products able to replace CFC 113 for the mentioned applications environment friendly.

To this purpose, in the solvent field, the use of alternative systems based on aqueous solutions, of non halogenated organic solvents and of hydrohalogenated solvents of the HCFC type has been suggested. These alternatives have however several drawbacks.

In particular it happens that the articles with microhollows, with capillary holes and surface irregularities, are insufficiently washed due to the relatively high water surface tension, also in the presence of surfactants.

The water removal rate is very low and when it is not completely removed it can cause corrosion phenomena of the metal articles previously washed. Therefore such surfaces must be suitably dried after being washed.

Hydrocarbons, alcohols or other non halogenated organic solvents, due to their high flammability, have not a generalized use and require however great investments to avoid the fire and explosion risk in the plants using them.

Besides, these solvents are an atmospheric pollution source since, when they are exposed to the sun light in the presence of nitrogen oxides, they undergo oxidative degradation phenomena, with formation of the so called "oxidizing smog" ozone-rich. Because of this negative characteristic these products are classified as VOC (Volatile Organic Compound).

Hydrohalogenated solvents represent a class of products more similar to CFC 113, they give lower use complications and allow more generalized applications with respect to the above mentioned alternative systems.

HCFC 141b, which has been and is one of the most valid substituents for these applications, has however the drawback to be moderately flammable and above all to be characterized by an ODP value equal to 0.11 (CFC 11=1) and therefore it has been subjected to use limitations and rules in favour of products having a lower or zero ODP.

The need was felt to have available alternative products able to further limit or to definitively overcome the above mentioned environmental and safety problems and able to allow a simpler and generalized use as solvent-cleaning agents.

The use of non toxic solvents having a low environmental impact, formed by hydrofluoropolyethers and compositions thereof having limited concentrations of polar substances selected among alcohols, ketones and ethers as described in the European patent application EP 805,199, is known in the removal of oils, greases, waxes, etc. from surfaces.

In connection with what described in the prior art the need was felt to have available valid alternatives to CFC 113.

It was in fact necessary to have available products able to remove oily substances in a substantially similar way to CFC 113, i.e. by partial or total solubilization of the substances to be removed, therefore differently from pure or additived hydrofluoropolyethers, in order to guarantee a more accurate and quicker cleaning of the articles having complex shapes and microhollows, with considerable advantages in terms of efficiency and economic saving of the cleaning operation.

Besides, products having chemical-physical properties more similar to CFC 113 allow the recovery of the existing plants without implying substantial modifications of the same and they allow to maintain practically unchanged the various operating steps of the article cleaning process.

Finally, the need was evident to limit or remove the environmental and safety problems typical of the conventional solvents (hydrocarbons, HCFC), and to reduce the costs of the cleaning operations deriving from the use of pure or additived HFPEs, as above described, since as it is known these products are obtained by complex and expensive processes.

The Applicant has unexpectedly found mixtures based on hydrofluoropolyethers (HFPE) having an azeotropic or near azeotropic behaviour, characterized by chemical-physical properties such as to be suitable as substitutes of CFC 113, and by an environmental impact expressed in terms of ODP lower than 0.027 and low GWP and VOC values.

The compositions of the present invention are able to meet the previously mentioned requirements, they can easily be used at acceptable costs with results almost similar to CFC 113, without implying substantial modifications to the various operating steps, in the respect and protection of the environment.

An object of the present invention are therefore azeotropic or near azeotropic compositions, based on 1-difluoromethoxy-1,1,2,2-tetrafluoroethyl difluoromethyl ether, to be used as CFC 113 substitutes having a low environmental impact, essentially consisting of:

|  |  | composition % by weight | |
|---|---|---|---|
|  |  | general | preferred |
| I) | 1-difluoromethoxy 1,1,2,2-tetrafluoroethyl difluoromethyl ether ($HCF_2OCF_2CF_2OCF_2H$); | 15–99 | 25–97 |
|  | isopentane | 85–1 | 3–75 |
| II) | 1-difluoromethoxy 1,1,2,2-tetrafluoroethyl difluoromethyl ether ($HCF_2OCF_2CF_2OCF_2H$); | 25–99 | 30–97 |
|  | methyl-acetate | 75–1 | 3–70 |
| III) | 1-difluoromethoxy 1,1,2,2-tetrafluoroethyl difluoromethyl ether ($HCF_2OCF_2CF_2OCF_2H$); | 35–99 | 38–97 |
|  | 1-bromo-propane | 65–1 | 62–3 |

More specifically the azeotropic compositions, which show an absolute minimum or maximum in the boiling temperature at the pressure of 1.013 bar with respect to the pure products, are so defined:

|  |  | compositions +/− 2% by weight |
|---|---|---|
| A) | 1-difluoromethoxy-1,1,2,2-tetrafluoroethyl difluoromethyl ether ($HCF_2OCF_2CF_2OCF_2H$); | 45% by wt. |
|  | isopentane | 55% by wt. |
| B) | 1-difluoromethoxy-1,1,2,2-tetrafluoroethyl difluoromethyl ether ($HCF_2OCF_2CF_2OCF_2H$); | 75% by wt. |
|  | methyl-acetate | 25% by wt. |
| C) | 1-difluoromethoxy-1,1,2,2-tetrafluoroethyl difluoromethyl ether ($HCF_2OCF_2CF_2OCF_2H$); | 75% by wt. |
|  | 1-bromo-propane | 25% by wt. |

Azeotropic or near azeotropic mixtures, object of the present invention, are based on hydrofluoropolyether 1-difluoromethoxy-1,1,2,2-tetrafluoroethyl difluoromethyl ether obtained by decarboxylation processes of the alkaline salts obtained by hydrolysis and salification of the corresponding acylfluorides, using processes known in the prior art. For example, decarboxylation is carried out in the presence of hydrogen-donor compounds, for example water, at temperatures of 140°–170° C. and under a pressure of at least 4 atm. See for example EP-695,775 and the Examples reported therein; this patent is herein incorporated by reference.

The commercially available hydrofluoropolyether 1-difluoromethoxy-1,1,2,2-tetrafluoroethyl difluoromethyl ether can contain up to about 15% by weight of difluoromethoxy-bis(difluoromethyl ether) ($HCF_2OCF_2OCF_2H$) as well as lower amounts of other hydrofluoropolyethers present as impurities.

The presence of these secondary components does not meaningfully change the azeotropic or near azeotropic behaviour of the mixtures object of the present invention.

The main characteristics of the hydrofluoropolyether on which the azeotropic or near azeotropic mixtures object of the present invention are based, are reported in Table 1 in comparison with CFC 113.

It has been found that the fluid reported in Table 1 is characterized by a combination of chemical-physical properties such as chemical inertia, high thermal stability, non flammability, evaporation heat and boiling temperature such as to be particularly suitable, in admixture with other organic solvents, for the substitution of CFC 113 in the above indicated industrial applications.

Preliminary studies relating to acute toxicity show that the product has a low biological activity, this encourages the completion of the chronic toxicity evaluations and puts the bases of a safe and easy use of the product in the indicated applications.

It has been found that the hydrofluoropolyether of the invention does not undergo dehydrofluorination reactions, which lead to the formation of potentially toxic olefins and avoids the formation of acidity which implies corrosion phenomena of metal materials.

The hydrofluoropolyether has an ODP value equal to zero and a low GWP value having a short half-life time, with consequent benefit on the greenhouse effect. The decomposition reactions which take place due to the radicals present in the atmosphere lead to the formation of simple molecules, not dangerous for the environment, and which do not contribute further to the hydrofluoropolyether greenhouse effect.

The mixtures based on the hydrofluoropolyether object of the present invention offer an advantageous combination of the boiling temperature and of the evaporation heat such as to confer to them a detergency/drying time suitably short and proper to the continuous operations both in liquid and in vapour phase.

The evaporation heat is sufficiently low and such as not to allow the solidification of the water traces which must be removed.

In detergency, solvency and drying applications, the use of mixtures having an azeotropic or near azeotropic behaviour is essential, in order to avoid fractionations or significant changes of the fluid composition during the industrial process steps which involve phase change phenomena (evaporation and condensation), as in the solvency case and, more generally, during all the operations of handling and storage of the fluids wherein accidental losses can happen due to the liquid evaporation and consequently variations of the nominal composition of the fluid to be used.

The composition variations which take place in all the cases in which non azeotropic mixtures are used, involve deviations of the solving agent performances and the need to proceed to differentiated fillings up in order to restore the original composition and therefore the chemical-physical properties of the mixture.

Besides, when the formulations contain more volatile flammable components, the vapour phase becomes rich in such component until it reaches the flammability limit, with dangers for the safety of the use.

Likewise, when the flammable component is less volatile, it concentrates in the liquid phase producing a flammable liquid.

To avoid such drawbacks it is necessary to use mixtures having an azeotropic or near azeotropic behaviour.

An azeotrope is a special mixture which has singular, unexpected and unpredictable chemical-physical properties, of which the most important ones are reported hereinafter.

An azeotrope is a mixture of two or more fluids which has the same composition in the vapour and in the liquid phase when it is in equilibrium under determined conditions.

The azeotropic composition is defined by particular temperature and pressure values; under these conditions the mixtures undergo phase changes at constant composition and temperature as if they were pure compounds.

A near azeotrope is a mixture of two or more fluids which has a vapour composition substantially equal to that of the liquid and undergoes phase changes without substantially modifying its composition and temperature.

A composition is near azeotropic when, after evaporation at constant temperature of 50% of the initial mass of the liquid, the percent variation of the vapour pressure between that of the initial and that of the final composition is lower than 10%. In the case of an azeotrope, no variation of the pressure between that of the initial composition and that obtained after evaporation of 50% of the liquid, is noticed.

Azeotropic or near azeotropic mixtures fall within the cases which show remarkable, both positive and negative, variations from the Raoult's law. As it is known to the skilled man in the art, such law is valid for systems having an ideal behaviour.

Deviations with respect to the ideality are caused by unexpected and unpredictable intermolecular interactions among the components of the binary or ternary system such as to generate higher or lower interactions than those existing among the molecules of the pure products.

When such deviations are sufficiently marked, the vapour pressure of the mixture in the azeotropic point must therefore be characterized by either higher or lower values than those of the pure compounds.

It is evident that, when the vapour pressure curve of the mixture shows a maximum, this corresponds to a minimum of the boiling temperature; viceversa to a minimum value of the vapour pressure it corresponds a maximum of the boiling temperature.

The azeotropic mixture admits only one composition for each value of the temperature and pressure.

However, by changing temperature and pressure, several azeotropic compositions can be obtained starting from the same components.

For example, the combination of all the compositions of the same components having a minimum or a maximum in the boiling temperature at different levels of pressure form a range of azeotropic compositions.

The mentioned mixtures can be used in combination with stabilizing agents in order to limit the reactions of radical decomposition which are favoured by the temperature and by the presence of metals.

The radical degradation reactions especially regarding the mixtures containing 1-bromo-propane, can be hindered or limited by using nitroparaffins and/or organic substances in the molecule of which double conjugated bonds are present.

The stabilizers used in combination with the compositions of the present invention have a concentration in the range 0.1–5% by weight with respect to the solvent-detergent and/or drying agent.

Surfactant agents soluble in the above mixtures can be used in order to further lower the interfacial tension with water to favour the removal phenomena of this from the surfaces subjected to drying and cleaning.

The compositions of the present invention can be used also in applications for aerosol as fluids for cleaning electronic components and as solvents for the preparation of spray formulations. The compositions used in these fields can be applied in combination with one or more propellants selected from HFC 134a (1,1,1,2-tetrafluoroethane), HFC 227ea (1,1,1,2,3,3,3-heptafluoropropane), HFC 236ea (1,1,1,2,3,3-hexafluoropropane) and mixtures thereof.

The following Examples are reported for illustrative but not limitative purposes of the scope of the present invention.

EXAMPLE 1

Evaluation of the Azeotropic or Near Azeotropic Behaviour

The mixture of known composition and weight is introduced into a small glass cell, previously evacuated, having an internal volume equal to about 20 $cm^3$, equipped with metal connections, feeding valve and with a pressure transducer to evaluate the system vapour pressure.

The filling ratio by volume is initially equal to about 0.8% by v.

The cell is introduced in a thermostatic bath and the temperature is slowly changed until an equilibrium value of the vapour pressure equal to 1.013 bar is obtained. The corresponding temperature is recorded and represents the mixture boiling temperature at the pressure of 1.013 bar.

The temperature is measured close to the equilibrium cell by a thermometer the accuracy of which is equal to +/−0.01° C.; particular attention has been paid so that the external temperature measured in the bath is really the internal one of the cell.

By changing the composition of the mixture it is possible to evaluate possible deviations with respect to the ideality and therefore to identify the azeotropic composition which, as said, will be characterized by an absolute minimum or maximum with respect to the pure components. Azeotropic compositions and their boiling temperatures are reported in Table 2.

In order to point out the near azeotropic behaviour, the mixtures identified close to the azeotrope have been subjected to evaporation test at their boiling temperature.

The cell content is removed at constant temperature by evaporation until having a loss corresponding to 50% by weight of the initial amount.

By the evaluation of the initial and final pressure the per cent variation suffered by the vapour pressure is determined: when the pressure variation is <10%, the mixture has a near azeotropic behaviour.

It is known that a near azeotropic mixture has a behaviour closer and closer to a true azeotrope when the percent variation is lower and lower and near to zero.

As a further confirmation of the azeotropic and near azeotropic behaviour, besides the above reported evaluations, the analyses of the composition of some mixtures object of the present invention before and after the evaporation test have been carried out by gaschromatographic technique.

The mixtures characterized by a near azeotropic behaviour undergo a limited variation in terms of composition. Analogously the variations connected to the boiling temperatures due to the composition change are very limited. The analyzed solutions were limpid and homogeneous at the boiling temperature and in the usual use conditions. The data referred to the near azeotropic behaviour of the compositions of the present invention are reported in Tables 3–5.

TABLE 1 chemical-physical and toxicological properties of the hydrofluoropolyether

| Chemical structure | $HCF_2OCF_2CF_2OCF_2H$ 1-difluoromethoxy-1,1,-2,2-tetrafluoroethyl difluoromethyl ether | CFC 113 1,1,2-trichloro-1,2,2-trifluoro-ethane |
|---|---|---|
| Molecular mass | 234.05 | 187.38 |
| Boiling temperature (° C., at 1.013 bar) | 58.21 | 47.55 |
| Evaporation latent heat (KJ/Kg, at 1.013 bar) | 139 | 144 |
| Liquid density at 25° C. (g/cm$^3$) | 1.60 | 1.56 |
| Flammability in air (% by volume) | non flammable | non flammable |
| ODP CFC 11 = 1 | 0 | 1.07 |
| lifetime (years) | <10 | 110 |
| GWP$_{100years}$ CO$_2$ = 1 | 1,725 | 5,000 |
| Acute toxicity in rat by os, LD$_{50}$ (ppmv/4 hours) | >5,000 | 43,000 |
| Acute toxicity in rat by inhalation, LC$_{50}$ (ppmv/4 hours) | >32,000 | 50,000 |
| Surface tension at 20° C. (dynes/cm) | 15.5 | 18.1 |
| Isotherm evaporation rate at 20° C. (mg/min) | 0.6 | 1 |

TABLE 2 azeotropic compositions (identification of maximum and minimum values in the boiling temperature at the pressure of 1.013 absolute bar)

| Component A | Component B | Azeotrope composition: component A (% by weight) | Azeotrope boiling temperature (° C.) |
|---|---|---|---|
| $HCF_2OCF_2CF_2OCF_2H$ 1-difluoromethoxy-1,1,2,2-tetrafluoro-ethyl difluoromethyl ether | Isopentane Boiling T = 27.18° C. | 44.9 | 23.93 |
| | Methyl-acetate Boiling T = 55.78° C. | 75.1 | 60.54 |
| | 1-Bromo-propane Boiling T = 69.60° C. | 75.0 | 51.05 |

TABLE 3 evaluation of the near azeotropic behaviour of the compositions 1-difluoromethoxy-1,1,2,2-tetrafluoroethyl difluoromethyl ether/Isopentane

| Initial composition: Component A♣ (% by wt) | Boiling temperature (° C.) | Initial pressure (bar) | New composition after evaporation of 50% by wt. of the liquid Component A (% by wt) | ΔP/P × 100 (%) |
|---|---|---|---|---|
| 46.6 | 23.96 (24.46)* (24.78)** | 1.013 | — | 0 |
| 15.2 | 24.25 | 1.013 | 13.6 | 0, 30 |
| 62.5 | 24.10 | 1.013 | — | 2, 06 |

*boiling temperature at the pressure of 1.013 bar after evaporation of 25% by weight of the initial liquid
**boiling temperature at the pressure of 1.013 bar after evaporation of 50% by weight of the initial liquid
♣component A contains 9.1% $HCF_2OCF_2OCF_2H$

TABLE 4 evaluation of the near azeotropic behaviour of the compositions 1-difluoromethoxy-1,1,2,2-tetrafluoroethyl difluoromethyl ether/Methyl-acetate

| Initial composition: Component A♣ (% by wt) | Boiling temperature (° C.) | Initial pressure (bar) | New composition after evaporation of 50% by wt. of the liquid Component A (% by wt) | ΔP/P × 100 (%) |
|---|---|---|---|---|
| 60.1 | 59.60 (61.94)** | 1.013 | 64.4 | 4.64 |
| 85.1 | 59.32 (62.34)** | 1.013 | 83.4 | 6.12 |

**boiling temperature at the pressure of 1.013 bar after evaporation of 50% by weight of the initial liquid
♣component A contains 9.1% $HCF_2OCF_2OCF_2H$

TABLE 5 evaluation of the near azeotropic behaviour of the compositions 1-difluoromethoxy-1,1,2,2-tetrafluoroethyl difluoromethyl ether/1-Bromo-propane

| Initial composition: Component A♣ (% by wt) | Boiling temperature (° C.) | Initial pressure (bar) | New composition after evaporation of 50% by weight of the liquid Component A (% by wt) | ΔP/P × 100 (%) |
|---|---|---|---|---|
| 55.0 | 51.98 (54.04)** | 1.013 | 50.4 | 6.91 |
| 85.0 | 51.24 (53.65)** | 1.013 | — | 8.09 |

**boiling temperature at the pressure of 1.013 bar after evaporation of 50% by weight of the initial liquid
♣component A contains 9.1% $HCF_2OCF_2OCF_2H$ The concentration of the component A shown in Tables 3–5 comprises also the presence of $HCF_2OCF_2OCF_2H$ as more remarkable secondary component contained in the commercial product.

EXAMPLE 2

Removal of Oily Products

The removal capability of oily products from printed circuits has been checked according to the following procedure:
a known amount of an oily product is uniformly spread on the surface of a printed circuit having 35×9 mm sizes; 0.100 g of oil are placed only on a single surface of the circuit, then the article is dipped into the solution to be tested.

After 5 minutes of dipping, the circuit is allowed to dry for additional 5 minutes at room temperature so as to remove the solvent traces and then is weighed again on an analytical balance.

The following oily products have been used:
1) Alkyl Benzene-Zerice S 46 Oil by ESSO
2) FluoroSilicone-FS 1265 Oil by DOW CORNING
3) Ester-Icematic SW 100 Oil by CASTROL
4) Mineral-Clavus 32 Oil by SHELL Tests of the solvent mixtures are carried out close to the boiling temperature. The compositions are placed in a vessel equipped with a condenser which recovers the vapour of the boiling solution.

In all the tests 30 ml of the solvent solution have been used.

The results are reported in Table 6 and are expressed as removed oil percentage. The data are compared with the values obtained from the reference tests with CFC 113, respectively carried out at the temperature of 23 and 47° C. 1-difluoromethoxy-1,1,2,2-tetrafluoroethyl difluoromethyl ether used to prepare the mixtures is a commercial product containing 9.1% of $HCF_2OCF_2OCF_2H$.

TABLE 6

| SOLVENT | Temperature °C. | Percentage of removed oil for oil type (% by weight) | | | |
|---|---|---|---|---|---|
| | | (1) | (2) | (3) | (4) |
| CFC 113 (comp) | 23 | 100 # | 99.5 ※ | 100 # | 100 # |
| CFC 113 (comp) | 47 | 100 # | 100 # | 100 # | 100 # |
| $HCF_2OCF_2CF_2OCF_2H$/ Isopentane (61.0) (39.0) | 23 | 100 # | 100 # | 100 # | 100 # |
| $HCF_2OCF_2CF_2OCF_2H$/ Methyl-acetate (75.0) (25.0) | 60 | 100 ∷ | 100 # | 100 # | 100 ∷ |
| $HCF_2OCF_2CF_2OCF_2H$/ 1-Bromo-propane (75.0) (25.0) | 51 | 100 # | 100 # | 100 # | 100 # |

In Table 6 it is meant by:
(1) Alkyl Benzene-Zerice S 46 Oil by ESSO
(2) FluoroSilicone-FS 1265 Oil by DOW CORNING
(3) Ester-Icematic SW 100 Oil by CASTROL
(4) Mineral-Clavus 32 Oil by SHELL
※ the removed oil is not completely soluble in the solvent mixture at the test temperature
the removed oil is completely soluble in the solvent mixture at the test temperature With the mixtures reported in Table 6 it is possible to obtain a wide solving action towards oily products of different type with results comparable to those obtained from CFC 113.

Besides, the wide availability of azeotropic and near azeotropic mixtures allows to select the best composition depending on the kind of the oily substance to be removed.

EXAMPLE 3

Spray Applications for the Cleaning of Electronic Components

The solubility of HFC 134a, HFC 227ea and HFC 236ea with some solvent compositions for aerosol applications for the cleaning of electronic components has been studied. The solvent composition is placed in a glass test tube having thick walls, resistant to high pressures, and closed at an end by a metal valve. After cooling, the propellant is fed to the test tube and mixed with the solvent mixture. The system is introduced in a thermostatic bath and heated up to 0°, 25° and 50° C. The complete solubility of the propellant in the solvent composition used for the test has been visually observed. The solubility results of the used propellants in the solvent compositions, at the above three different temperatures, are reported in Table 7.

TABLE 7

| Propellants | Solvent compositions (% by weight) | Propellant concentration in admixture with the solvent compositions (% by wt) | Temperature (° C.) | | |
|---|---|---|---|---|---|
| | | | 0 | 25 | 50 |
| HFC 134a | $HCF_2OCF_2CF_2OCF_2H$/ Isopentane (45.0) (55.0) | 51.2 | S | S | S |
| HFC 134a | $HCF_2OCF_2CF_2OCF_2H$/ Methyl-acetate (75.0) (25.0) | 51.3 | S | S | S |
| HFC 134a | $HCF_2OCF_2CF_2OCF_2H$/ Bromo-propane (75.0) (25.0) | 57.2 | S | S | S |
| HFC 227ea | $HCF_2OCF_2CF_2OCF_2H$/ Methyl-acetate (75.0) (25.0) | 53.2 | S | S | S |
| HFC 236ea | $HCF_2OCF_2CF_2OCF_2H$/ Isopentane (45.0) (55.0) | 57.9 | S | S | S |

S = The propellant is completely soluble in the used solvent.

What is claimed is:

1. Azeotropic or near azeotropic compositions, based on 1-difluoromethoxy-1,1,2,2-tetrafluoroethyl difluoromethyl ether, essentially consisting of:

| | composition % by weight |
|---|---|
| I) 1-difluoromethoxy 1,1,2,2-tetrafluoroethyl difluoromethyl ether ($HCF_2OCF_2CF_2OCF_2H$); | 15–99 |
| isopentane | 85–1 |
| II) 1-difluoromethoxy 1,1,2,2-tetrafluoroethyl difluoromethyl ether ($HCF_2OCF_2CF_2OCF_2H$); | 25–99 |
| methyl-acetate | 75–1 |
| III) 1-difluoromethoxy 1,1,2,2-tetrafluoroethyl difluoromethyl ether ($HCF_2OCF_2CF_2OCF_2H$); | 35–99 |
| 1-bromo-propane | 65–1. |

2. Azeotropic or near azeotropic compositions according to claim 1 essentially consisting of:

|   | composition % by weight |
|---|---|
| I) 1-difluoromethoxy 1,1,2,2-tetrafluoroethyl difluoromethyl ether $(HCF_2OCF_2CF_2OCF_2H)$; | 25–97 |
| isopentane | 3–75 |
| II) 1-difluoromethoxy 1,1,2,2-tetrafluoroethyl difluoromethyl ether $(HCF_2OCF_2CF_2OCF_2H)$ | 30–97 |
| methyl-acetate | 3–70 |
| III) 1-difluoromethoxy 1,1,2,2-tetrafluoroethyl difluoromethyl ether $(HCF_2OCF_2CF_2OCF_2H)$ | 38–97 |
| 1-bromo-propane | 62-3. |

3. Azeotropic compositions according to claim 1 which show an absolute minimum or maximum in the boiling temperature at the pressure of 1.013 bar with respect to the pure products, so defined:

|   |   |
|---|---|
| A) 1-difluoromethoxy-1,1,2,2-tetrafluoroethyl difluoromethyl ether $(HCF_2OCF_2CF_2OCF_2H)$; | 45% by wt. |
| isopentane | 55% by wt. |
| B) 1-difluoromethoxy-1,1,2,2-tetrafluoroethyl difluoromethyl ether | 75% by wt. |
| $(HCF_2OCF_2CF_2OCF_2H)$ methyl-acetone | 25% by wt. |
| C) 1-difluoromethoxy-1,1,2,2-tetrafluoroethyl difluoromethyl ether $(HCF_2OCF_2CF_2OCF_2H)$; | 75% by wt. |
| 1-bromo-propane | 25% by wt. |

4. Near azeotropic compositions according to claim 1 wherein 1-difluoromethoxy-1,1,2,2-tetrafluoroethyl difluoromethyl ether contains up to 15% by weight of difluoromethoxy-bis(difluoromethyl ether).

5. Compositions according to claim 1 comprising stabilizers for reactions of radical decomposition the concentration of which is in the range 0.1–5% by weight with respect to the solvent-detergent and/or drying agent.

6. Compositions according to claim 5, wherein the stabilizers are selected among nitroparaffins and/or organic substances containing double bonds.

7. A method of cleaning or drying a substrate, comprising applying to the substrate the composition of claim 1.

8. The method of claim 7, wherein the composition of claim 1 is applied to electronic components as an aerosol or spray in combination with one or more propellants.

9. The method of claim 8, wherein the propellant is selected from the group consisting of HFC 134a (1,1,1,2-tetrafluoroethane), HFC 227ea (1,1,1,2,3,3,3-heptafluoropropane), and mixtures thereof.

* * * * *